United States Patent [19]
Bilimoria et al.

[11] Patent Number: 6,006,920
[45] Date of Patent: Dec. 28, 1999

[54] BRIGHTNESS, REDUCED IMPURITY CLAYS AND METHODS OF MAKING SAME

[75] Inventors: Bomi M. Bilimoria; Mark S. Willis, both of Macon, Ga.

[73] Assignee: Dry Branch Kaolin Company, Dry Branch, Ga.

[21] Appl. No.: 08/853,536

[22] Filed: May 9, 1997

[51] Int. Cl.$^6$ .................................. B03C 1/00; B03B 1/04
[52] U.S. Cl. .................................. 209/8; 209/5; 209/214; 209/232; 106/486; 501/146
[58] Field of Search .................................. 209/3, 8, 9, 39, 209/214, 231, 232, 4, 5; 423/113; 106/486; 501/146

[56] References Cited

U.S. PATENT DOCUMENTS

| | | | |
|---|---|---|---|
| 3,853,983 | 12/1974 | Abercrombie, Jr. et al. | 209/8 X |
| 4,087,004 | 5/1978 | Nott et al. | 209/9 |
| 4,125,460 | 11/1978 | Nott et al. | 209/8 |
| 4,225,425 | 9/1980 | Price et al. | 209/214 X |
| 4,834,898 | 5/1989 | Hwang | 252/62.56 |
| 4,906,382 | 3/1990 | Hwang | 210/695 |
| 5,332,493 | 7/1994 | Ginn et al. | 209/8 X |
| 5,527,426 | 6/1996 | Marwah et al. | 162/5 |

OTHER PUBLICATIONS

NALCO Material Safety Data Sheet for NALCO 9868; Feb. 10, 1997.

*Primary Examiner*—Tuan N. Nguyen
*Attorney, Agent, or Firm*—Needle & Rosenberg, P.C.

[57] ABSTRACT

Provided is a method of making improved brightness kaolin clay from an aqueous kaolin clay slurry in which the primary active dispersant is a weak dispersant, at least including the steps of adding to the kaolin clay an effective magnet enhancer reagent wherein the magnet enhancer reagent comprises an aqueous solution of one or more magnetic oxides and one or more surface active agents; conditioning the kaolin clay; and performing high gradient magnetic separation on the conditioned kaolin clay to produce an improved brightness kaolin clay. The method is also applied to decreasing iron- and/or titania-containing impurities in a clay.

85 Claims, No Drawings

BRIGHTNESS, REDUCED IMPURITY CLAYS AND METHODS OF MAKING SAME

BACKGROUND OF THE INVENTION

1. Field of the Invention

The present invention relates to the field of reduction of iron- and titania-containing impurities from clays. Specifically, the present invention relates to an improved method of using magnetic separation to remove iron- and titania-containing impurities from clay, and thus to make a high brightness clay.

2. Background Art

Naturally occurring minerals such as natural clays, carbonates, talcs or so forth, frequently include discoloring contaminants in the form of iron and/or iron-stained titanium-based impurities. In many natural clays, including kaolin clays, and particularly the sedimentary kaolins of Georgia, such impurities are commonly present as iron-stained anatase and rutile. For kaolin clays and others of the minerals mentioned, it is often desired and sometimes imperative to refine the natural product and bring the brightness characteristics thereof to a level acceptable for paper coating and other applications. Various techniques have been used previously to effect the removal of this type of discoloring impurity.

For example, hydrosulfites have been widely used for converting at least part of the iron-based (or "ferruginous") impurities to soluble form, which may then be removed from the clays. Additionally, among the most effective methods for removing titaniferous impurities, including, e.g., iron-stained anatase, are the well-known froth flotation techniques. According to such methods, an aqueous suspension or slurry of the clay is formed, the pH of the slurry is raised to an alkaline value, for example, by the addition of ammonium hydroxide, and a collecting agent is added, as for example, oleic acid. The slurry is then conditioned by agitation for a relatively sustained period. A frothing agent, such as pine oil is then added to the conditioned slurry, after which air is passed through the slurry in a froth flotation cell to effect separation of the impurities.

In recent years, it has further been demonstrated that high intensity magnetic separation techniques may be utilized for removing certain of this type of impurity, including titaniferrous impurities, and certain ferruginous matter. Anatase, for example, and certain other paramagnetic minerals, have been found to respond to high intensity magnetic fields.

For example, U.S. Pat. No. 3,471,011 (Lannicelli et al.), discloses that clay slurries may be beneficiated by retention for a period of from about 30 seconds to 8 minutes in a magnetic field of 8,500 Gauss or higher. U.S. Pat. No. 3,676,337 (Kolm) discloses a process for treating mineral slurries by passing same through a steel wool matrix in the presence of a background field of at least 12,000 Gauss. Various apparatus, such as that disclosed in Marston, U.S. Pat. No. 3,627,678, may be utilized in carrying out the Kolin processes. In this latter instance the slurry is thus passed through a canister, which contains a stainless steel or similar filamentary ferromagnetic matrix, while a high intensity magnetic field is impressed on the matrix by enveloping coils.

Magnetic separation can be an inexpensive, selective and efficient method for separating a particulate mixture. Many techniques have been used to magnetize nonmagnetic or paramagnetic particles to permit them to be selectively separated from a mixture by magnetic separation. For example, Shubert U.S. Pat. No. 3,926,789 discloses wetting the surface of mineral particles with an emulsified magnetic fluid to render them magnetic. C. de Latour, *Journal of Americain Waterworks Association*, Vol. 68, 443 (1976) discloses using an inorganic coagulant, such as ferric chloride or aluminum sulfate, to agglomerate particles nonselectively in a system which contains a mixture of magnetite and other materials. J. Y. Hwang, et al., IEEE transactions on Magnetics, Vol. MAG-18, No. 6, p. 1689 (1982) discloses adding an organic polymer flocculent to a mixture of magnetite and other minerals to yield a selective co-flocculation of magnetite and desired minerals. Yen, et al., U.S. Pat. No. 4,285,819 and Whitehead, et al., U.S. Pat. No. 4,554,088 disclose methods which involve coating magnetic materials with a polymer and then coupling the polymer-coated magnetite particles to the particles to be magnetized. P. Parsonage P, IMM Tenth Annual Commodity, Paper No. W86007 (1985) discloses introducing fine magnetite into a pulp of mineral slurries in which the desired minerals are conditioned to carry a surface charge opposite to that of magnetite to favor coating of magnetite. Briggs, et al., U.S. Pat. No. 4,019,995, Shimoiizaka U.S. Pat. No. 4,094,804, Khalafalla, et al., U.S. Pat. No. 4,208,294, Chagnon U.S. Pat. No. 4,356,098 and Wyman U.S. Pat. No. 4,430,239 disclose ferrofluids which are Newtonian liquids containing suspended, small magnetic particles which do not settle out under the influence of gravity and an external magnetic field.

U.S. Pat. Nos. 4,834,898 and 4,906,382 to Hwang provide reagents and methods for magnetizing nonmagnetic materials utilizing a reagent comprising water containing particles of a magnetic material, such as magnetite, each of which is coated with a two layer surfactant coating including an inner layer and an outer layer. The inner layer covers the particle and is a monomolecular layer of a first water soluble, organic, heteropolar surfactant containing at least 3 carbon atoms and having a functional group on one end which forms a bond with the magnetic particle and a hydrophobic end. The outer layer coats the inner layer and is a monomolecular layer of a second water soluble, organic, heteropolar surfactant containing at least 3 carbon atoms and having a hydrophobic end bonded to the hydrophobic end of the first surfactant and a functional group oriented outwardly toward the water. Nonmagnetic particles are magnetized by contacting their surfaces with the magnetizing reagent in an aqueous medium and the coated magnetic particles couple with the nonmagnetic particles by adsorption. U.S. Pat. Nos. 4,087,004 and 4,125,400 to Nott et al., provide magnetic beneficiation of clays utilizing magnetic particulates, including particulates of ferroso-ferric oxide particles.

The present invention provides a method that allows improved processing of lower brightness clays by increasing the removal of iron- and titania-containing impurities in the clay. Since the selective mining of higher brightness crude clays continues to deplete the quantity of available reserves of these high brightness crudes, such method is of great benefit.

SUMMARY OF THE INVENTION

The present invention provides a method of making improved brightness kaolin clay from an aqueous kaolin clay slurry in which the primary active dispersant is a weak dispersant, comprising:

a. adding to the kaolin clay an effective magnet enhancer reagent wherein the magnet enhancer reagent comprises an aqueous solution of one or more magnetic oxides and one or more surface active agents;

b. conditioning the kaolin clay; and c. performing high gradient magnetic separation on the conditioned kaolin clay to produce an improved brightness kaolin clay.

The clay can comprise a crude or a previously processed clay, such as a blunged crude kaolin clay, a degritted kaolin clay, a fractionated kaolin clay. Additional processing steps can be performed if desired.

The present invention further provides a method of decreasing iron- and/or titania-containing, impurities in a clay present in an aqueous clay slurry in which the primary active dispersant is a weak dispersant, comprising:

a. adding to the clay an effective magnet enhancer reagent wherein the magnet enhancer reagent comprises an aqueous solution of one or more magnetic oxide and one or more surface active agent;

b. conditioning the clay, and c. performing high gradient magnetic separation on the conditioned clay.

The method can be used on any clay having iron- and/or titania-containing impurities such as clay comprising kaolin clay, halloysite clay, dickite clay. Additional processing steps can be performed if desired.

DETAILED DESCRIPTION OF THE INVENTION

As used in the specification and in the claims, "a" can mean one or more, depending upon the context in which it is used.

The present invention provides a method of making improved brightness kaolin clay from an aqueous kaolin clay slurry in which the primary active dispersant is a weak dispersant, comprising:

a. adding an effective magnet enhancer reagent wherein the enhancer reagent comprises an aqueous solution of one or more magnetic oxide and one or more surface active agent;

b. conditioning the kaolin clay; and c. performing high gradient magnetic separation on the conditioned kaolin clay.

This method is typically used for kaolin clays, for which high brightness is desirable.

The present invention also provides a method of decreasing iron- and/or titania-containing impurities in a clay present in an aqueous clay slurry in which the primary active dispersant is a weak dispersant, comprising:

a. adding to the clay an effective magnet enhancer reagent wherein the magnet enhancer reagent comprises an aqueous solution of one or more magnetic oxide and one or more surface active agent;

b. conditioning the clay; and c. performing high gradient magnetic separation on the conditioned clay.

This method can be used on any clay having iron- and/or titania-containing impurities such as clay comprising kaolin clay, halloysite clay, dickite clay.

A magnet enhancer reagent is a reagent that enhances the removal of iron- and titania-containing impurities from a clay. In the present method, the magnet enhancer reagent is a composition comprising an aqueous solution of one or more magnetic oxides and one or more surface active agents that can aid in the successful attachment of the magnetic oxide to the impurity. An effective magnet enhancer reagent is one capable of aiding in the removal of magnetic impurities from clay as can be determined by performing the herein described method, and as exemplified in the examples. Magnetic oxides in the reagent can be represented generally by the formula MO, 5 wherein M is a divalent metal such as Fe, Ni, Co, Mn, and Mg. Magnetic oxides in the reagent can include, for example, iron oxides (e.g., FeO, $Fe_2O_3$ (magnetite powder), $Fe_3O_4$), cobalt oxides, nickel oxides, and any metal combination such as ferroso-ferric oxides, cobalt ferric oxide ($CoFe_2O_4$), $NiFe_2O_4$. Additional suitable magnetic oxides are described in U.S. Pat. No. 4,906,382 (Hwang), U.S. Pat. No. 4,834,898 (Hwang), U.S. Pat. No. 4,125,460 (Nott et al.), U.S. Pat. No. 4,078,004 (Nott et al.). A "surface active agent" as used in the claims is a surfactant or blend of surfactants that, when used in a reagent with a magnetic oxide, produces a magnet enhancement reagent capable of enhancing the removal of iron- and titania-containing impurities from a clay subjected to magnetic separation, relative to the impurities removed under magnetic separation without the enhancer reagent added. Suitable surfactants typically have molecules exhibiting a long hydrophobic tail and a cloud point above 65° C.; furthermore, suitable surfactants typically have relatively low HLB values, such as 10 or less, 9 or less, 8 or less, 7 or less, 6 or less, or 5 or less, where HLB equals the ratio of weight percentages of hydrophilic to hydrophobic groups in the molecule. Examples of suitable surface active agents are listed in U.S. Pat. No. 5,527,426 (Marwah et al.). Additional magnet enhancement reagent examples: Nalco product referred to as TX-9263 or TX-9520 or 95DM144 or 9868 (Nalco Chemical Co. Naperville, Ill.).

Typically the magnet enhancer reagent, at 5% activity, is present at about 0.5 lb/ton kaolin to about 7.5 lb/ton kaolin. The magnet enhancer reagent, at 5% activity, can be present at about 1.0 to about 5.0 lb/ton kaolin, about 1.5 to about 4.0 lb/ton kaolin, about 2.0 to about 3.5 lb/ton kaolin. "5% activity" means 5% solids concentration of the active iron oxide.

The clay slurry with the effective magnet enhancer reagent is then conditioned. "Conditioning" is a term known in the art for imparting high shear to the clay in an aqueous environment. Any type of rotor device that can impart high shear to the clay can be used. By imparting high shear is meant imparting typically the shear achieved by a rotor blade tip speed of at least 50 feet per second, and usually of a range of about 50 to about 200 feet per second. Therefore any rotor device that can achieve a rotor blade tip speed of about 50 to about 200 feet per second can be utilized for conditioning in this method. A preferred mill is one capable of achieving a rotor tip speed of about 125 to 150 feet per second. Appropriate rotor devices include a rotor-stator type mill, e.g., a rotor-stator mill manufactured by Kady International (Scarborough, Ma.) (herein referred to as a "Kady mill") and a rotor-stator mill manufactured by Impex (Milledgeville, Ga.) (herein referred to as an "Impex mill"); a blade-type high shear mill, such as a Cowles blade (Morehouse Industries, Inc., Fullerton, Calif.); and a high shear media mill, such as a sand grinder. The clay slip is conditioned for a time sufficient to enhance the subsequent magnetic separation step, so long as no adverse effects on the clay quality are incurred. Conditioning times can vary according to the device used to impart the shear. Conditioning can be performed for any suitable time period greater than 0 seconds. For example, for conditioning with a Kady mill, the slip can be conditioned for about 1 minute to about 10 minutes, and a typical range can be from about 2 minutes to about 8 minutes, from about 3 minutes to about 6 minutes or from about 4 minutes to about 5 minutes. These typical times can be applied to other shearing devices based upon the relative shear imparted by those devices as compared to the Kady mill, with which application to other devices one of skill in the art is familiar.

The conditioned clay slurry with an effective magnet enhancer reagent is then subjected to high gradient magnetic separation. High gradient magnetic separation is a process generally known in the art, and is described, e.g., in U.S. Pat. No. 4,125,460 (Nott et al.) and U.S. Pat. No. 4,078,004 (Nott et al.), U.S. Pat. No. 3,627,678 (Marston). In general, a stainless steel matrix steel matrix having an open structure (e.g. stainless steel wool, stainless steel balls, nails, tacks, etc.), subjected to a magnetic field is utilized, through which the conditioned slurry is passed. The retention time in the magnet matrix and the magnet cycle can be varied as desired, according to standard methods. The high gradient magnetic separation is preferably performed at a time from about immediately after conditioning to about 7 days after conditioning, can be performed within about 4 days after conditioning, or can preferably be performed immediately after conditioning.

The kaolin clay in the slurry for either method can comprise any kaolin clay, crude, processed or partially processed, in which an increase in brightness is desired. For example, the kaolin clay can be a crude kaolin clay. The crude can comprise any kaolin crude clay, for example, it can comprise grey clay, it can comprise cream clay, and thus the crude can be a combination of clays, such as a clay predominantly grey crude (or "hard") or a clay predominantly cream clay (or "soft"). Alternatively, the crude can comprise Brazilian kaolin crude or English kaolin crude. The crude can contain organic matter (i.e., grey crude) or it can be a crude substantially lacking organic matter (i.e., cream, tan, brown, or red crudes). As discussed below, the selection of starting crude can guide the choice of additional processing steps one can add to the basic present method to achieve the desired high brightness product. For example, when the starting crude material is a grey crude, one can optionally additionally employ ozone treatment prior to addition of the magnet enhancer reagent or after the magnetic separation.

The clay comprising the slurry of the impurity-reduction methods can be any clay having iron- and/or titania-containing impurities such as clay comprising kaolin clay, as described above, and further can comprise halloysite clay or dickite clay, for example.

Additionally, the clay in the slurry used in either method can be a fractionated clay, which includes any clay whose particle size distribution has been modified or aggregated, such as by mechanical methods or by alternative methods such as chemical fractionation or aggregation, which methods are all known in the art. Fractionation can be performed at any desired step in the method, such as prior to adding the magnet enhancer reagent, prior to conditioning, prior to magnetic separation, after magnetic separation, or after any of the standard processing steps performed after magnetic separation. The clay can be a degritted clay, i.e., such that it meets +325 mesh residue specifications for paper coating applications. It is recommended that the crude be degritted for practical purposes of preventing unnecessary wear on the mill used for the conditioning step.

The kaolin clay in the slurry can be a blunged crude clay. If the clay is blunged prior to performing the present method, i.e., it is performed on the same slip that will undergo the present magnetic separation method, it is preferable to blunge the clay with a weak dispersant, and at an alkaline pH. Such blunging should be performed prior to adding the magnet enhancer reagent. However the blunging is performed, the slurry, prior to adding the magnet enhancer reagent, should have as the primary, or predominant, active dispersant a weak dispersant, as described below.

The blunging prior to adding the magnet enhancement reagent is preferably performed at a pH range of about 7.0 to about 11.0, i.e., at an alkaline pH, as measured by the "in-processing method," described below. The blunging can be performed at a pH range of about 8.0 to about 10.0 or at a pH of about 8.0 to about 9.5, all as measured by the in-processing method. For example, the blunging can be performed at pH 8.0 to pH 9.5, as measured by the in-processing method. The blunting can be performed at a solids range of from greater than 0 to about 70% solids, or from about 20% solids to about 70% solids; a preferred solids range can be about 30% solids to about 70% solids, about 20% solids to about 65% solids, about 20% solids to about 60% solids, about 30% solids to about 60% solids, about 40% solids to about 60% solids, about 20% solids to about 45% solids, about 35% solids to about 55%, about 39% solids to about 44% solids.

The "In-processing pH method" by which all pH values provided herein are measured and defined is as follows: procedure for Measuring pH of Slip During Processing ("In-Processing pH Method")

a. Equipment and Reagents
1. Corning model or Beckman portable model pH meter with gel filled combination electrode and temperature compensator probe.
2. pH buffer solutions 4 and 7.

b. Procedures
1. The pH meter should be calibrated at the start of the work day.
2. Put the electrode and temperature compensation probe in a beaker containing the slip.
3. Allow the reading to stabilize.
4. Record the reading.
5. Rinse electrode and temperature compensation probe after reading is recorded.

The starting clay for all methods provided herein is an aqueous clay slurry in which the primary active dispersant is a weak dispersant. As used in the claims, a 'weak dispersant' is one that does not significantly compete for adsorption on the surface of the $TiO_2$ impurity relative to the adsorption of the magnet enhancer reagent, whereas a "strong dispersant" is one that dominates adsorption on the surface of the $TiO_2$ impurity, thereby making adsorption of the magnet enhancer reagent insignificant. A useful weak dispersant will typically be low foaming. An example of a weak dispersant includes sodium silicate.

Additionally, at any time prior to magnetic separation, a strong dispersant can be added to the clay. An example of a strong dispersant for this method is a sodium polyacrylate. Examples of a sodium polyacrylate include Colloid 211 (Rhône-Poulene, Marietta, Ga.) and sodium hexametaphosphate ("Calgon," Calgon Corp., Pittsburgh, Penn.). The strong dispersant can be present, on an active basis, at a range of from 0 lb/ton kaolin (kaolin weight on a dry basis) to about 2.0 lb/ton kaolin (kaolin weight on a dry basis), for example, at from 0.1 lb/ton kaolin to 1.0 lb/ton kaolin on a dry basis. The amount may vary according to specific characteristics of the clay. One can readily vary the amount as determined to be optimal for any selected kaolin clay.

Furthermore, prior to high gradient magnetic separation, the pH of the clay can be adjusted to about 7.0 to about 11.0 as measured by the in-processing pH method. The pH can be, e.g., about 8.0 to about 9.0, about 8.5 to about 9.0, and a preferred pH range can be about 8.0 to about 9.5, all as measured by the in-processing pH method. To raise pH, one can use any alkali such as sodium hydroxide, or a blend of sodium silicate and sodium hydroxide. Alternatively, the pH can be adjusted using sodium silicate.

Additionally, prior to the high gradient magnetic separation, the percent solids of the slurry can be adjusted to from greater than 0% to about 70%, from about 10% to about 70%, from about 20% to about 60%, from about 20% to about 45%, or from about 25% to about 40%.

As described above, then, the present invention also provides a method of making improved brightness kaolin clay from a kaolin clay that has been blunged with a weak dispersant at alkaline pH and degritted, comprising: a. dispersing the kaolin clay with a magnet enhancer reagent to a pH of about 7.0 to about 10.0 as measured by the in-processing method, or more preferably, about 8.0 to 9.5 as measured by the in-processing method, wherein the enhancement reagent comprises an aqueous solution of one or more magnetic iron oxides and one or more surfactant agents; b. conditioning the kaolin clay, and c. performing high gradient magnetic separation on the kaolin clay.

Also as described above, then, the present invention provides a method of making improved brightness kaolin clay from a fractionated kaolin that has been blunged with a weak dispersant at alkaline pH, comprising: a. dispersing the kaolin clay with a magnet enhancer reagent to a pH of about 7.0 to about 10.0 as measured by the in-processing method, or more preferably, about 8.0 to 9.5 as measured by the in-processing, method, wherein the enhancer reagent comprises an aqueous solution of one or more magnetic iron oxides and one or more surfactant agents; b. conditioning the kaolin clay; and c. performing high gradient magnetic separation on the kaolin clay.

Additionally, the clay (or crude), kaolin or other clay, can be ground, i.e., delaminated, at any point in the present process, before or after magnetic separation. Delamination methods are well known in the art. Thus, delamination can be performed on a resultant improved brightness kaolin clay or on an resultant reduced-impurities clay to produce a delaminated improved brightness kaolin clay product or a delaminated reduced-impurities clay product, respectively.

Furthermore, fractionation can be performed at any time in the method, such as on a resultant improved brightness kaolin clay or on an resultant reduced-impurities clay to produce a fractionated improved brightness kaolin clay product or a fractionated reduced-impurities clay product, respectively. Any fraction, such as a coarse fraction, or all fractions, can be selected for delamination.

After magnetic separation, any typical processing can be performed on the resultant improved product. For example, the product can be flocculated, to produce a flocculated improved brightness kaolin clay product or a flocculated reduced-impurities clay product, respectively. Alternatively or additionally, the product can be leached to produce a leached improved brightness kaolin clay product or a leached reduced-impurities clay product, respectively.

The method can further comprise dewatering the fractionated, flocculated, and/or leached improved brightness kaolin clay or reduced-impurities clay. Dewatering includes any amount of water removal, so that the resultant improved brightness kaolin clay or reduced-impurities clay can be a slurry, a partially dried clay, or a fully dried clay, as is known in the art.

Some examples of a typical process for making an improved brightness kaolin clay or for removing iron- and/or titania-containing impurities from any clay containing such impurities include the following steps.

1) Blunge—degrit—add magnet enhancer—condition—magnetic separation—further processing
2) Blunge—degrit—fractionate—add magnet enhancer—condition—magnetic separation—further processing
3) Blunge—degrit—ozone treat—add magnet enhancer—condition—magnetic separation—further processing.
4) Blunge—degrit—ozone treat—fractionate—add magnet enhancer—condition—magnetic separation—further processing.
5) Blunge—degrit—fractionate—ozone treat—add magnet enhancer—condition—magnetic separation—further processing.
6) Blunge—degrit—add magnet enhancer—condition—magnetic separation—fractionate—further processing.
7) Blunge—degrit—add magnet enhancer—condition—magnetic separation—fractionate—delaminate—further processing.

In these examples, further processing can include any or all of the following: no treatment, spray drying, fractionating, flocculating, leaching, dewatering.

The present invention is more particularly described in the following examples which are intended as illustrative only since numerous modifications and variations therein will be apparent to those skilled in the art.

EXAMPLES

Example 1

The crude was blunged in water as a blend of 75% coarse Cretaceous crude and 25% fine tertiary crude. This blend was blunged to about 42% solids at pH=9.2 using a dispersant blend of 5 parts sodium silicate to 1 part sodium hydroxide. After degritting this crude through a Dorr-Cone, sandbox and 100 mesh screen, the crude was fractionated on a Bird Machine Co. (South Walpole, Mass.) centrifuge to obtain a fine fraction of 92% less than two microns as measured on a Sedigraph 5100 (Micromeritics, Norcross, Ga.). No further work was done on the coarse fraction. The fines were at 28.7% solids.

The fine fraction was dosed with 0.5 lb./ton of Colloid 211 (Rhone Poulenc, Marietta, Ga.) (sodium polyacrylate) on an as received basis followed by adding 2.5 lbs./ton of Nalco 95DM144 as a 5% active reagent. After the chemicals had a couple hours to mix in, the slip was conditioned through a Kady mill consuming from 38 to 57 HP-hours/ton. The conditioned slip was processed through a high gradient magnetic separator filled with a nominal matrix [60$\mu$ in diameter]. The slip was retained in the magnet matrix for 3 minutes and the magnet cycle had a duration of 12 minutes. The fines were then treated with sulfuric acid to lower the pH to 2.8, dosed with 4 lbs./ton of sodium dithionite and then filtered. The filter cake was reblunged with soda ash and sodium polyacrylate to a pH=6.2 and then spray dried.

The brightness of this material was determined to be 90.97, and the Hunter "b" value was 2.09.

Example 2

Delaminated Products

For this example, the same type of crude (cream/brown/tan) was blunged and degritted in a manner similar to that described in Example 1. This crude was then screened on a 150 mesh screen and treated with 0.875 lb./ton of Colloid 211 and 2 lbs./ton of Nalco 95DM 144. The slip was conditioned in a Kady mill for 5 minutes and the Kady mill product was put through the magnetic separator with a nominal matrix (60μ matrix). The magnet retention time was 3 minutes and the cycle time was 12 minutes. The magnet product was fractionated on a centrifuge to produce a fines fraction of 92% less than 2μ and a coarse component which was used to produce delaminated products.

The fines component was acid flocced to pH=2.8 with sulfuric acid and leached with 4 lbs./ton of sodium dithionite and filtered. The filter cake was redispersed with sodium carbonate and sodium polyacrylate and the slip was spray dried. This product is identified as Product A in Table I below.

The coarse rejects were ground in a sand grinder for 18 minutes and one half of the ground product was acid flocced to pH=2.8 with sulfuric acid and leached with 4 lbs./ton of sodium dithionite and filtered. The filter cake was redispersed with sodium carbonate and sodium polyacrylate and the slip was spray dried. This product is identified as Product B in Table I below.

The other half of the sand ground slip was fractionated to recover 90% of the fines and then treated with acid and leached and processed as described above. This product is identified as Product C in Table I below.

TABLE I

| PRODUCT I.D. | BRIGHTNESS | HUNTER "B" VALUE | % $TIO_2$ | % $FE_2O_3$ |
|---|---|---|---|---|
| Crude | | | 1.81 | 0.563 |
| Product A | 90.28 | 1.53 | 0.398 | 0.388 |
| Product B | 89.97 | 1.31 | 0.179 | 0.207 |
| Product C | 90.12 | 1.31 | 0.181 | 0.210 |

Example 3

Grey Crude

The crude for this example was blunged in water as a blend of 33.33% grey coarse crude, 33.33% cream coarse crude, and 33.33% cream fine crude. This blend was blunged at about 42% solids at pH=8.45 using a dispersant of 5 parts sodium silicate to 1 part of sodium hydroxide. After degritting this crude through a Dorr-Cone, sandbox and 100 mesh screen, the crude was treated with ozone by standard methods to oxidize the organic impurities in the crude. It was then fractionated on a centrifuge to obtain a fine fraction of 92% less than 2μ as measured on a Sedigraph. No further processing was done on the coarse fraction. The fine fraction slip was at 31.3% solids.

This fine fraction was dosed with only 3.5 lbs./ton of Nalco 9868 as a 5% active reagent and conditioned in the Kady mill for 4 minutes. The conditioned slip was processed through a magnetic separator with a nominal (60μ) matrix. The magnet retention time was 3 minutes and the cycle time was 12 minutes. The slip was flocculated with sulfuric acid to pH=2.8, leached with 4 lbs./ton of sodium dithionite and then filtered. The filter cake was then reblunged with sodium carbonate and sodium polyacrylate and then dried in an oven.

The brightness of this material was determined to be 91.59 and the Hunter "b" value was 1.93.

Throughout this application, various publications are referenced. The disclosures of these publications in their entireties are hereby incorporated by reference into this application in order to more fully describe the state of the art to which this invention pertains.

Although the present process has been described with reference to specific details of certain embodiments thereof, it is not intended that such details should be regarded as limitations upon the scope of the invention except as and to the extent that they are included in the accompanying claims.

What is claimed is:

1. A method for improving the brightness of kaolin clay using an aqueous kaolin clay slurry in which the primary active dispersant is a weak dispersant, comprising the steps of:
   a. adding an effective magnet enhancer reagent to the kaolin clay slurry wherein the magnet enhancer reagent comprises an aqueous suspension comprising one or more insoluble magnetic oxides and one or more surface active agents;
   b. conditioning the resulting kaolin clay slurry; and
   c. performing high gradient magnetic separation on the conditioned kaolin clay slurry to produce an improved brightness kaolin clay.

2. The method of claim 1, wherein the kaolin clay comprises a crude kaolin clay.

3. The method of claim 2, wherein the kaolin clay comprises a blunged crude kaolin clay.

4. The method of claim 1, wherein the kaolin clay comprises a degritted kaolin clay.

5. The method of claim 1, wherein the kaolin clay comprises fractionated kaolin clay.

6. The method of claim 1, further comprising the step of fractionating the kaolin clay slurry prior to the high gradient magnetic separation.

7. The method of claim 1, wherein the kaolin clay slurry is blunged at about pH 7.0 to about 11.0, as measured by the in-processing pH method, prior to the step of adding the magnet enhancer reagent.

8. The method of claim 1, wherein the kaolin clay slurry is blunged at about 20% solids to about 70% solids, prior to the step of adding the magnet enhancer reagent.

9. The method of claim 1, wherein the weak dispersant is sodium silicate.

10. The method of claim 1, further comprising the step of adding a strong dispersant to the kaolin clay slurry, at any time prior to the high gradient magnetic separation step.

11. The method of claim 10, wherein the strong dispersant is present, on an active basis, at from 0 lb/ton kaolin clay to about 2.0 lb/ton kaolin clay.

12. The method of claim 10, wherein the strong dispersant is a sodium polyacrylate.

13. The method of claim 1, wherein the magnet enhancer reagent, at 5% activity, is present at about 0.5 lb/ton kaolin to about 7.5 lb/ton kaolin.

14. The method of claim 1, wherein the conditioning step is performed at high shear.

15. The method of claim 14, wherein the conditioning step is performed using a rotor-stator assembly to generate the high shear.

16. The method of claim 14, wherein the conditioning step is performed using a blade-type high shear assembly to generate the high shear.

17. The method of claim 14, wherein the conditioning step is performed using a high shear media mill to generate the high shear.

18. The method of claim 1, further comprising the step of adjusting the pH of the kaolin clay slurry to about 7.0 to about 10.0, as measured by the in-processing pH method, prior to the high gradient magnetic separation step.

19. The method of claim 18, wherein the pH of the kaolin clay slurry is adjusted with an alkali.

20. The method of claim 18, wherein the pH of the kaolin clay slurry is adjusted with sodium silicate.

21. The method of claim 1, further comprising the step of adjusting the percent solids to from about 10% to about 70%, prior to the high gradient magnetic separation step.

22. The method of claim 1, wherein the high gradient magnetic separation step is performed at a time from about immediately after the conditioning step to about 7 days after the conditioning step.

23. The method of claim 1, further comprising the step of fractionating the resultant improved brightness kaolin clay to a desired size.

24. The method of claim 23, further comprising the step of flocculating the fractionated components of the improved brightness kaolin clay.

25. The method of claim 24, further comprising the steps of leaching the fractionated, flocculated improved brightness kaolin clay.

26. The method of claim 25, further comprising the step of dewatering the fractionated, flocculated, leached improved brightness kaolin clay.

27. The method of claim 1, further comprising the step of flocculating the resultant improved brightness kaolin clay.

28. The method of claim 27, further comprising the step of leaching the flocculated improved brightness kaolin clay.

29. The method of claim 28, further comprising the step of dewatering the flocculated, leached improved brightness kaolin clay.

30. The method of claim 1, further comprising the steps of fractionating the product of the magnetic separation step and grinding at least one of the fractions to produce a delaminated, improved brightness kaolin clay.

31. The method of claim 30, further comprising the step of flocculating the delaminated, improved brightness kaolin clay.

32. The method of claim 31, further comprising the step of leaching the delaminated, flocculated improved brightness kaolin clay.

33. The method of claim 32, further comprising the step of dewatering the delaminated, flocculated, leached improved brightness kaolin clay.

34. The method of claim 1, further comprising the step of grinding the product of the high gradient magnetic separation step to produce a delaminated, improved brightness kaolin clay.

35. The method of claim 34, further comprising the step of flocculating the delaminated, improved brightness kaolin clay.

36. The method of claim 35, further comprising the step of leaching the delaminated, flocculated improved brightness kaolin clay.

37. The method of claim 36, further comprising the step of dewatering the delaminated, flocculated, leached improved brightness kaolin clay.

38. The method of claim 1, further comprising the step of grinding the kaolin clay slurry prior to the step of adding the magnet enhancer reagent.

39. The method of claim 1, wherein the clay is derived from a clay comprising cream crude.

40. The method of claim 1, wherein the clay is derived from a clay comprising grey crude.

41. The method of claim 1, further comprising the step of ozone treating the clay slurry prior to the step of adding the magnet enhancer reagent.

42. The method of claim 1, further comprising the step of ozone treating the clay after the high gradient magnetic separation step.

43. A method of decreasing iron- or titania-containing impurities in a clay present in an aqueous clay slurry in which the primary active dispersant is a weak dispersant, comprising the steps of:
   a. adding an effective magnet enhancer reagent to the clay slurry wherein the magnet enhancer reagent comprises an aqueous suspension comprising one or more insoluble magnetic oxides and one or more surface active agents;
   b. conditioning the resulting clay slurry; and
   c. performing high gradient magnetic separation on the conditioned clay slurry.

44. The method of claim 43, wherein the clay comprises kaolin clay.

45. The method of claim 43, wherein the clay comprises halloysite clay.

46. The method of claim 43, wherein the clay comprises dickite clay.

47. The method of claim 43, wherein the clay comprises a degritted clay.

48. The method of claim 43, wherein the clay comprises fractionated clay.

49. The method of claim 43, further comprising the step of fractionating the clay slurry prior to the magnetic separation step.

50. The method of claim 43, wherein the clay slurry is blunged at about pH 7.0 to about 11.0, as measured by the in-processing pH method, prior to the step of adding the magnet enhancer reagent.

51. The method of claim 43, wherein the clay slurry is blunged at about 20% solids to about 70% solids prior to the step of adding the magnet enhancer reagent.

52. The method of claim 43, wherein the weak dispersant is sodium silicate.

53. The method of claim 43, further comprising the step of adding a strong dispersant to the clay prior to the step of adding said magnet enhancer reagent.

54. The method of claim 53, wherein the strong dispersant is present, on an active basis, at greater than 0 lb/ton clay to about 2.0 lb/ton clay.

55. The method of claim 53, wherein the strong dispersant is a sodium polyacrylate.

56. The method of claim 43, wherein the magnet enhancer reagent, at 5% activity, is present at about 0.5 lb/ton to about 7.5 lb/ton.

57. The method of claim 43, wherein the conditioning step is performed at high shear.

58. The method of claim 57, wherein the conditioning step is performed using a rotor-stator assembly to generate the high shear.

59. The method of claim 57, wherein the conditioning step is performed using a blade-type high shear assembly to generate the high shear.

60. The method of claim 57, wherein the conditioning step is performed using a high shear media mill to generate the high shear.

61. The method of claim 43, further comprising the step of adjusting the pH of the clay slurry to about 7.0 to about 10.0, as measured by the in-processing pH method prior to the high gradient magnetic separation step.

62. The method of claim 61, wherein the pH of the clay slurry is adjusted with an alkali.

63. The method of claim 61, wherein the pH of the clay slurry is adjusted with sodium silicate.

64. The method of claim 43, further comprising the step of adjusting the percent solids to from about 10% to about 70% prior to the magnetic separation step.

65. The method of claim 43, wherein the high gradient magnetic separation step is performed at a time from about immediately after the conditioning step to about 7 days after the conditioning step.

66. The method of claim 43, further comprising the step of fractionating the resultant magnet-separated clay to a desired size.

67. The method of claim 66, further comprising the step of flocculating the fractionated components of the magnet-separated clay.

68. The method of claim 67, further comprising the step of leaching the fractionated, flocculated magnet-separated clay.

69. The method of claim 68, further comprising the step of dewatering the fractionated, flocculated, leached magnet-separated clay.

70. The method of claim 43, further comprising the step of flocculating the resultant magnet-separated clay.

71. The method of claim 70, further comprising the step of leaching the flocculated magnet-separated clay.

72. The method of claim 71, further comprising the step of dewatering the flocculated, leached magnet-separated clay.

73. The method of claim 43, further comprising the step of fractionating the product of magnetic separation and grinding at least one of the fractions to produce a delaminated, impurity-reduced clay.

74. The method of claim 73, further comprising the step of flocculating the delaminated, impurity-reduced clay.

75. The method of claim 74, further comprising the step of leaching the delaminated, flocculated impurity-reduced clay.

76. The method of claim 75, further comprising the step of dewatering the delaminated, flocculated, leached impurity-reduced clay.

77. The method of claim 43, further comprising the step of grinding the product of magnetic separation to produce a delaminated, impurity-reduced clay.

78. The method of claim 77, further comprising the step of flocculating the delaminated, impurity-reduced clay.

79. The method of claim 78, further comprising the step of leaching the delaminated, flocculated impurity-reduced clay.

80. The method of claim 79, further comprising the step of dewatering the delaminated, flocculated, leached impurity-reduced clay.

81. The method of claim 43, further comprising the step of grinding the clay prior to the step of adding the magnet enhancer reagent.

82. The method of claim 43, wherein the clay is derived from a clay comprising cream crude.

83. The method of claim 43, wherein the clay is derived from a clay comprising grey crude.

84. The method of claim 43, further comprising the step of ozone treating the clay prior to the step of adding the magnet enhancer reagent.

85. The method of claim 43, further comprising the step of ozone treating the clay after the step of performing magnetic separation.

* * * * *